(12) United States Patent
Kim et al.

(10) Patent No.: US 8,071,230 B2
(45) Date of Patent: Dec. 6, 2011

(54) HIGH RATE CHARGING AND DISCHARGING CYLINDRICAL SECONDARY BATTERY

(75) Inventors: Sungjong Kim, Daejeon (KR); Ji Hyun Lee, Seoul (KR); SangMinh Lee, Chungcheongbuk-do (KR); Hokyung Byun, Gyeongsangnam-do (KR); Geun Ho Seo, Busan (KR)

(73) Assignee: LG Chem, Ltd. (KR)

( * ) Notice: Subject to any disclaimer, the term of this patent is extended or adjusted under 35 U.S.C. 154(b) by 390 days.

(21) Appl. No.: 11/673,831

(22) Filed: Feb. 12, 2007

(65) Prior Publication Data
US 2007/0212595 A1 Sep. 13, 2007

(30) Foreign Application Priority Data
Mar. 13, 2006 (KR) .................. 10-2006-0022950

(51) Int. Cl.
*H01M 2/12* (2006.01)
*H01M 2/08* (2006.01)

(52) U.S. Cl. ............. 429/53; 429/82; 429/56; 429/174; 429/185

(58) Field of Classification Search .............. 429/53, 429/82, 174, 56, 185
See application file for complete search history.

(56) References Cited

U.S. PATENT DOCUMENTS

| | | | | |
|---|---|---|---|---|
| 3,168,420 A | * | 2/1965 | Jammet | 429/170 |
| 3,622,397 A | * | 11/1971 | Belove | 429/55 |
| 6,083,644 A | * | 7/2000 | Watanabe et al. | 429/231.1 |
| 6,086,643 A | * | 7/2000 | Clark et al. | 29/623.2 |
| 6,258,477 B1 | * | 7/2001 | Kashihara et al. | 429/53 |
| 6,620,543 B2 | * | 9/2003 | Li | 429/53 |
| 6,926,992 B2 | * | 8/2005 | Isozaki et al. | 429/59 |
| 2003/0198863 A1 | * | 10/2003 | Murashige et al. | 429/53 |
| 2005/0214641 A1 | * | 9/2005 | Kim | 429/175 |

FOREIGN PATENT DOCUMENTS

| | | |
|---|---|---|
| JP | 2003-051294 | 2/2003 |
| JP | 2003-187773 | 7/2003 |
| JP | 2004-152707 | 5/2004 |

* cited by examiner

*Primary Examiner* — Melvin Mayes
*Assistant Examiner* — Bijay Saha
(74) *Attorney, Agent, or Firm* — Cantor Colburn LLP

(57) ABSTRACT

Disclosed herein is a cylindrical secondary battery including a cap assembly constructed in a structure in which a vent, which intercepts electric current and discharges pressurized gas when the interior pressure of the battery is increased due to abnormal operation of the battery, is in contact with a top cap having a protruding central part, wherein the end of the vent is bent to surround the outer circumferential surface of the top cap, and a groove for preventing the leakage of an electrolyte and preventing the occurrence of defectiveness of the battery during the assembly of the battery is formed at interfaces between the vent and the top cap such that the groove is arranged in parallel with the outer circumferential surface of the top cap. The secondary battery according to the present invention has the effect of accomplishing high charging and discharging rate, providing uniform output even when external physical impacts, such as vibration or dropping, are applied to the secondary battery, and preventing the occurrence of defectiveness during the assembly of the secondary battery. Furthermore, the leakage of the electrolyte out of the battery is restrained under these conditions. Consequently, the secondary battery according to the present invention can be preferably used as a high-output power source.

14 Claims, 6 Drawing Sheets

HIGH RATE CHARGING AND DISCHARGING CYLINDRICAL SECONDARY BATTERY

FIELD OF THE INVENTION

The present invention relates to a cylindrical secondary battery having high charging and discharging rate, and, more particularly, to a cylindrical secondary battery including a cap assembly constructed in a structure in which a vent, which intercepts electric current and discharges pressurized gas when the interior pressure of the battery is increased due to abnormal operation of the battery, is in contact with a top cap having a protruding central part, wherein the end of the vent is bent to surround the outer circumferential surface of the top cap, and a groove is formed at interfaces between the vent and the top cap for preventing the leakage of an electrolyte and preventing the occurrence of defectiveness of the battery during the assembly of the battery, thereby accomplishing stable electrical connection between the vent and the top cap, providing instantaneously high output, providing stable output even when external impacts, such as vibration, are applied to the battery, preventing leakage of an electrolyte due to surface pressure resulting from the shape of the groove, and preventing the occurrence of defectiveness of the battery during the assembly of the battery.

BACKGROUND OF THE INVENTION

As mobile devices have been increasingly developed, and the demand of such mobile devices has increased, the demand of secondary batteries has also sharply increased as an energy source for the mobile devices. Among them is a lithium secondary battery having high energy density and high discharge voltage, on which much research has been carried out and which is now commercially and widely used.

When a secondary battery is used as a power source for mobile phones or laptop computers, it is necessary for the secondary battery to stably provide uniform output. When a secondary battery is used as a power source for power tools, such as electric-powered drills, on the other hand, it is necessary for the secondary battery to provide instantaneously high output while the secondary battery is stable against external physical impacts, such as vibration or dropping.

In this connection, the structure of a conventional cylindrical secondary battery is shown in FIG. 1. Generally, a secondary battery 10 includes a cylindrical container 20, a jelly-roll type electrode assembly 30 mounted in the container 20, and a cap assembly 40 coupled to the upper part of the container 20.

The electrode assembly 30 is constructed in a structure in which a cathode 31 and an anode 32 are wound in a jelly-roll shape while a separator 33 is interposed between the cathode 31 and the anode 32. To the cathode 31 is attached a cathode tap 34, which is connected to the cap assembly 40. To the anode 32 is attached an anode tap (not shown), which is connected to the lower end of the container 20.

The cap assembly 40 includes a top cap 41 constituting a cathode terminal, a positive temperature coefficient (PTC) element 42 for intercepting electric current through the increase of battery resistance when the interior temperature of the battery is increased, a vent 43 for intercepting electric current and/or discharge gas when the interior pressure of the battery is increased, a gasket 44 for electrically isolating the vent 43 from a cap plate 45 excluding a specific portion and sealing the interior of the battery, and the cap plate 45 connected to the cathode tap 34, which is attached to the cathode 31. The cap assembly 40 is constructed in a structure in which the top cap 41, the PTC element 42, the vent 43, the gasket 44, and the cap plate 45 are sequentially stacked one on another.

However, it has been proven that it is difficult for the secondary battery with the above-stated construction to provide instantaneously high output, and the resistance of the contact surfaces of the secondary battery is increased when external impacts, such as vibration, is applied to the secondary battery, whereby it is difficult for the secondary battery to provide uniform output. Specifically, the PTC element 42 has an electrical resistance of approximately 7 to 32 m$\Omega$ at room temperature, and the resistance of the PTC element 42 is sharply increased when the temperature is increased. Consequently, the PTC element 42 may serve as a factor to stop the provision of instantaneously high output. For this reason, a structure excluding the PTC element 42 is needed.

Nevertheless, the secondary battery with the above-stated construction has a problem in that, when external impacts, such as vibration, are applied to the secondary battery, the resistance at the contact surfaces between the top cap 41, the PTC element 42, the vent 43, and the cap plate 45 is greatly changed, and therefore, the secondary battery cannot provide uniform output. For example, the resistance at the contact surfaces between the top cap 41 and the PTC element 42 or the vent 43 is increased by approximately 20 to 30 m$\Omega$.

The increase of the interior resistance induces generation of heat from a high-current secondary battery used as a power source for power tools. As a result, the safety of the battery may be lowered, and therefore, the performance of the battery may be decreased.

In this connection, Japanese Unexamined Patent Publication No. 2003-187773 discloses a technology for bending the end of a vent such that the outer circumferential surface of a top cap can be surrounded by the bent end of the vent and fixing the bent end of the vent to the top cap by welding so as to prevent the contact resistance between the vent and the top cap from being increased due to extreme vibrations or impacts applied to a battery and the degradation of a gasket resulting from the long-term use of the battery.

Even though there is a difference in terms of purpose and effect, a technology for surrounding the top cap using a member, such as a vent, is disclosed in Japanese Unexamined Patent Publication No. 2004-152707, and a technology for attaching the end of a battery container and a seam part to each other by laser welding is disclosed in Japanese Unexamined Patent Publication No. 2003-051294.

The technology for surrounding the outer circumferential surface of the top cap with the end of the vent has an advantage in that the increase of the contact resistance due to the vibrations or impacts is restrained, as compared to the structure in which the vent and the top cap are in surface contact with each other, and therefore, a battery adopting this technology can be used as a high-current power source. However, it has been proven that, when the battery adopting this technology is used in devices that induce great vibrations, such as power tools, the contact surfaces between the vent and the top cap are instantaneously spaced apart from each other in spite of the above-described structure, and an electrolyte leaks out of the battery through the resulting gap. Furthermore, it has been proven that the fixed state of the top cap fixed to the vent is not stable, in spite of the bent structure of the end of the vent, with the result that the relative movement between the top cap and the vent is caused, and therefore, during the assembly process, specifically, when a current intercepting member is attached to the lower end of the vent by welding or the vent and the top cap are attached to each other by welding, the welding operations are not performed at predetermined positions (correct positions), whereby the defectiveness of the battery is caused.

On the other hand, it has been proven that, although the technology for attaching the bent end of the vent to the top cap by welding provides an excellent coupling force, the welded portions are exposed to the outside of the battery, and the exposed portions are degraded due to the long-term use of the battery, whereby the coupling force is considerably lowered.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have found that, when the outer surface of a top cap is surrounded by the end of a vent, and a groove is formed at the interface between the vent and the top cap, the increase of the contact resistance is restrained even when external forces, such as vibrations or impacts, are applied to a battery, the leakage of an electrolyte out of the battery is prevented, and the defective product rate is considerably decreased during the assembly of the battery. In addition, the inventors of the present invention have found that, when a welding operation is performed adjacent to the outer circumferential surface of the top cap at the above-described structure, the welded region is not exposed to the outside, whereby the reduction of a coupling force due to the degradation of the welded part caused by the long-term use of the battery is restrained, and therefore, the increase of the contact resistance is restrained. The present invention has been completed based on these findings.

In accordance with the present invention, the above and other objects can be accomplished by the provision of a cylindrical secondary battery including a cap assembly constructed in a structure in which a vent, which intercepts electric current and discharges pressurized gas when the interior pressure of the battery is increased due to abnormal operation of the battery, is in contact with a top cap having a protruding central part, wherein the end of the vent is bent to surround the outer circumferential surface of the top cap, and a groove for preventing the leakage of an electrolyte and preventing the occurrence of defectiveness of the battery during the assembly of the battery is formed at interfaces between the vent and the top cap such that the groove is arranged in parallel with the outer circumferential surface of the top cap.

As previously described, devices, such as power tools, require instantaneously high output, and external forces such as vibrations or impacts are frequently applied to the devices because of their working environment characteristics. Consequently, it is necessary for the secondary battery to be constructed such that the leakage of the electrolyte is restrained, the occurrence of defectiveness of the battery is restrained during the assembly of the battery, and the degradation of battery components is restrained while the secondary battery stably provides high output even when the external forces are applied to the battery. As can be seen from the following experiment results, it has been proven that a cylindrical secondary battery having the above-described cap assembly structure can satisfy all the above-mentioned requirements.

The vent is a kind of safety element that secures the safety of the battery by discharging gas out of the battery when the interior pressure of the battery is increased due to the abnormal operation of the battery or the degradation of battery components. For example, when gas is generated in the battery, and therefore, the interior temperature of the battery exceeds the critical pressure, the vent is broken, and gas discharged through the broken region of the vent is discharged out of the battery through one or more gas discharging holes formed in the top cap.

Preferably, the vent is constructed in a structure in which the central part of the vent is depressed, and a first notch and a second notch are formed at the upper bent region and the lower bent region of the vent, respectively, so as to intercept electric current before the gas is discharged under the above-described abnormal conditions. To the lower end of the vent is connected a current intercepting member for intercepting electric current before the vent is broken. The current intercepting member includes one or more gas discharging holes and a protrusion, which protrudes upward and can be separated from the remainder of the current intercepting member when pressure is applied to the current intercepting member. The protrusion of the current intercepting member is coupled to the lower end of the vent, and a cathode tap is connected to the remainder of the current intercepting member excluding the protrusion.

In a preferred embodiment, the current intercepting member is constructed in a structure in which three to five through-holes and bridges interconnecting the through-holes are formed about the protrusion on a concentric circle, and notches are formed at the bridges. Consequently, when the interior pressure of the battery is increased, the vent is more easily separated from the current intercepting member, whereby the electric isolation between the electric current member and the safety member is accomplished.

The vent is not particularly restricted so long as the end of the vent is made of a conductive material that can be bent to surround the outer circumferential surface of the top cap. Preferably, the vent is made of aluminum having high conductivity, softness, and malleability.

The cylindrical secondary battery is constructed in the sectional shape of a circle. Consequently, the top cap and the vent of the cylindrical secondary battery are constructed generally in a disc structure. According to the present invention, the end of the vent is bent vertically, and then the bent end of the vent is brought into tight contact with the top cap such that the outer circumferential surface of the top cap is surrounded by the bent end of the vent. The length of the top cap surrounded by the vent is approximately 5 to 40%, preferably 10 to 30%, of the radius of the top cap. The bent region of the vent is surrounded by a gasket.

According to the present invention, the groove is formed at the interfaces between the vent and the top cap for preventing the leakage of the electrolyte from the battery and, at the same time, preventing the occurrence of defectiveness of the battery during the assembly of the battery. The groove is continuously arranged in parallel with the outer circumferential surface of the top cap. The groove may have various sectional shapes. For example, the groove may be a protruding groove, a step-shaped (stair-shaped) groove, a depressed groove, or a combination thereof (for example, a saw-toothed groove).

Also, the groove is formed at the interfaces between the vent and the top cap. Specifically, the groove may be formed at the upper interface of the top cap or at the lower interface of the top cap. Alternatively, grooves may be formed at the upper and lower interfaces of the top cap, respectively. Preferably, the groove is formed at the lower interface of the top cap in such a manner that a portion of the top cap protrudes.

When the vent is made of aluminum having high softness and malleability, the vent around the groove is deformed, such that the vent is brought into tight contact with the outer surface of the groove, after the end of the vent is bent and pressed such that the outer circumferential surface of the top cap is surrounded by the end of the vent. Consequently, the size of the contact interface is increased, and therefore, the leakage of the electrolyte out of the battery is prevented, and, at the same time, the degradation of the battery components due to moisture introduced into the battery is prevented. Furthermore, the movement of the top cap is restrained, and therefore, the top cap and the vent are located at their correct positions during the assembly of the battery. Consequently, the occurrence of defectiveness due to the movement deviation is prevented.

The size of the groove is not particularly restricted so long as the groove provides the above-described effects. The size of the groove is appropriately decided in consideration of the thickness, the softness, and the malleability of the vent. In a preferred embodiment, the height of the groove may be 5 to 80%, preferably 10 to 50%, of the thickness of the vent.

The process for surrounding the outer circumferential surface of the top cap with the end of the vent may be performed as follows. For example, the top cap is positioned on the vent having an outer diameter greater than the outer diameter of the top cap. Subsequently, the extension part of the vent is bent vertically, and is then bent toward the center axis of the top cap. After that, the bent part of the vent is pressed (rolled). For the economical efficiency of the manufacturing process, it is preferable that the above process be continuously performed in the mass production.

During the vertical bending process and the horizontal bending process, on the other hand, an end region (A) of the vent corresponding to the outer circumferential surface of the top cap is greatly deformed. As a result of many trials and errors and various experiments, the inventors of the present invention have found that, when the above-described process is continuously carried out, large stress is concentrated on the end region (A) of the vent, and therefore, the partial breakage of the vent (i.e., the defective product rate) is increased.

Consequently, it is preferable to manufacture the battery by primarily bending the end of the vent such that the end of the vent is at an angle of 30 to 60 degrees to a central axis of the top cap, and, after a predetermined period of time necessary for stress to be dispersed from the end region (A) has lapsed, secondarily bending the primarily bent end of the vent, such that the bent end of the vent is brought into tight contact with the upper end surface of the top cap, and then pressing the secondarily bent end of the vent. This discontinuous process minimizes the defective product rate.

In a preferred embodiment, a welding operation is performed at one or more portions of the contact interfaces between the vent and the top cap so as to increase the mechanical coupling force between the vent and the top cap and more stably accomplish the electrical connection between the vent and the top cap. This welding operation may be performed at the interface adjacent to the outer circumferential surface of the top cap such that the welded part is not exposed to the outside of the battery. As previously described, the conventional art proposes the technology for welding the exposed end of the vent to the top cap. However, this conventional technology has a problem in that the welded part may be degraded due to the long-term exposure of the welded part. According to the present invention, on the other hand, the welded part is formed at the interface adjacent to the outer circumferential surface of the top cap, and is sealed by the gasket. Consequently, the present invention solves the above-mentioned problem.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
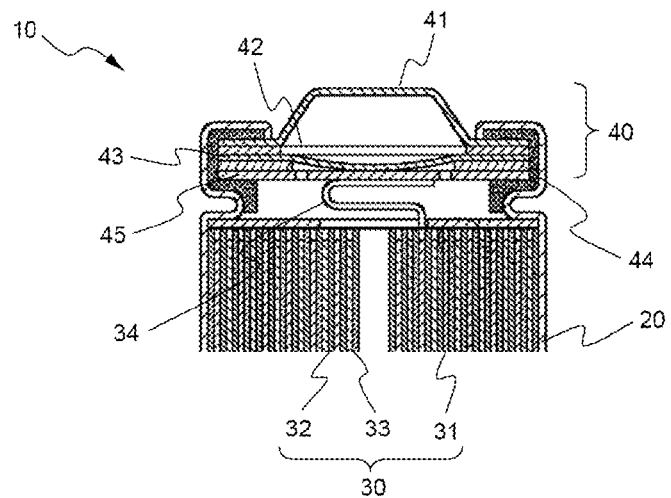
FIG. 1 is a sectional view typically illustrating a representative upper structure of a conventional cylindrical secondary battery.
Figure 2:
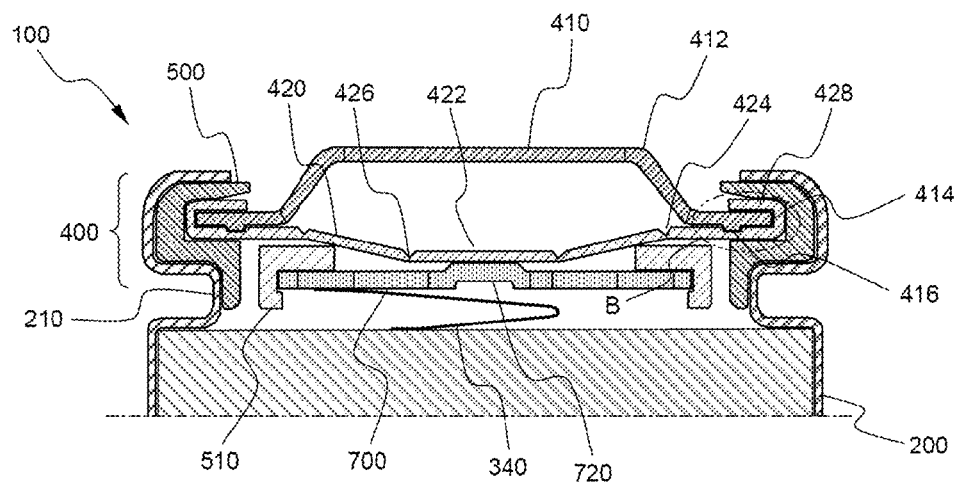
FIG. 2 is a sectional view typically illustrating an upper structure of a secondary battery according to a preferred embodiment of the present invention.

FIG. 2 is a sectional view typically illustrating a cap assembly structure of a secondary battery according to a preferred embodiment of the present invention.

Referring to FIG. 2, a battery 100 according to the present invention is manufactured by inserting an electrode assembly (not shown) into a container 200, injecting an electrolyte into the container 200, and mounting a cap assembly 400 to the open upper end of the container 200.

The cap assembly 400 is constructed in a structure in which a top cap 410 and a vent 420 for lowering the interior pressure of the battery are in tight contact with each other inside a gasket 500 mounted to an upper beading part 210 of the container 200 for maintaining airtightness. The top cap 410 is formed such that the central part of the top cap 410 protrudes upward, and therefore, the top cap 410 serves as a cathode terminal, to which an external circuit is connected. The top cap 410 is provided along the circumference of the protruding part thereof with a plurality of through-holes 412, through which pressurized gas is discharged out of the container 200.

The vent 420 is a thin-film structure through which electric current flows. The central part of the vent 420 is depressed to form a depressed central part 422, and two notches 424 and 426 having different depths are formed at upper and lower bent regions of the central part 422, respectively.

Figure 3:
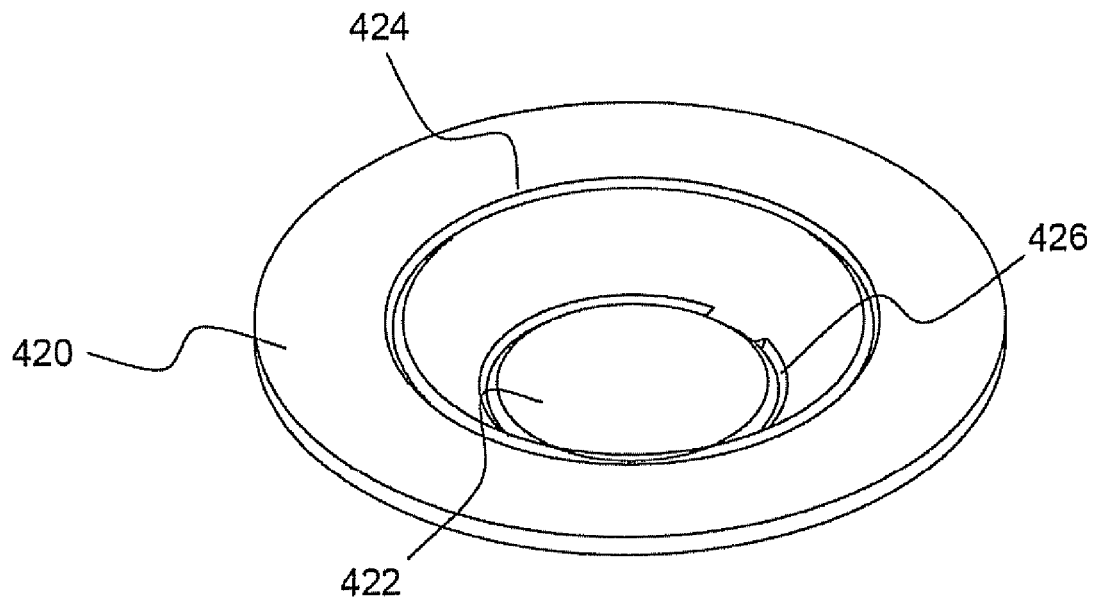
FIG. 3 is a perspective view illustrating a vent used in the secondary battery of FIG. 2.

As shown in FIGS. 2 and 3, one of the notches 424 and 426, i.e., the first notch 424, which is formed at the upper bent region of the central part 422, is constructed in a closed-circle structure, whereas the other notch, i.e., the second notch 426, which is formed at the lower bent region of the central part 422, is constructed in an open-circle structure which is opened at one side thereof. Also, the second notch 426 has a coupling force less than that of the first notch 424, and the second notch 426 is deeper than the first notch 424.

When the interior pressure of the container 200 is increased to more than the critical pressure, the second notch 426 of the vent 420 is broken with the result that the pressurized gas is discharged out of the container 200 through the though-holes 412 of the top cap 410.

Below the vent 420 is mounted a current intercepting member 700 for discharging gas out of the battery and, at the same time, intercepting electric current in the above-described process. The current intercepting member 700 is a conductive plate-shaped member, to which an auxiliary gasket 510 is mounted. The electrode assembly (not shown) may include a structure in which a cathode and an anode are wound in a jelly-roll shape, while a separator is interposed between the cathode and the anode. To the cathode is attached a cathode tap 340, which is connected to the current intercepting member 700.

Figure 4:
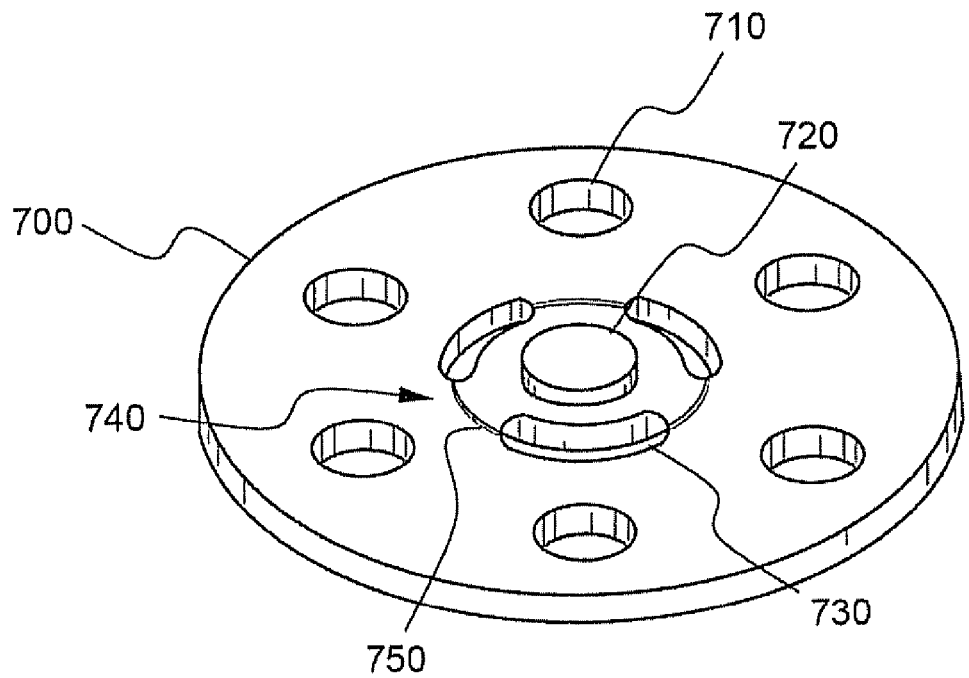
FIG. 4 is a perspective view illustrating a current intercepting member used in the secondary battery of FIG. 2.

An example of the current intercepting member 700 is illustrated in FIG. 4. The current intercepting member 700 is provided at predetermined positions adjacent to the circumference thereof with a plurality of through-holes 710, through which gas is discharged. The current intercepting member 700 is provided at the center thereof with a protrusion 720, which protrudes upward. In addition, three through-holes 730 and three bridges 740 interconnecting the through-holes 730 are formed about the protrusion 720 on a concentric circle in a symmetrical fashion. Notches 750 are formed at the bridges 740. Consequently, when the interior pressure of the battery is increased, and therefore, the pressurized gas is applied to the vent 420 (see FIG. 2), the depressed central part 422 is raised. As a result, the notches 750 are broken, and therefore, the protrusion 720 welded to the depressed central part 422 is separated from the main body of the current intercepting member 700.

Referring back to FIG. 2, an end 428 of the vent 420 surrounds the outer circumference surface 414 of the top cap 410, and a protruding groove 416 is formed at the lower end surface of the top cap 410. A region B is illustrated in FIG. 5 with an enlarged scale so that the above-mentioned structure can be seen in more detail.

Figure 5:
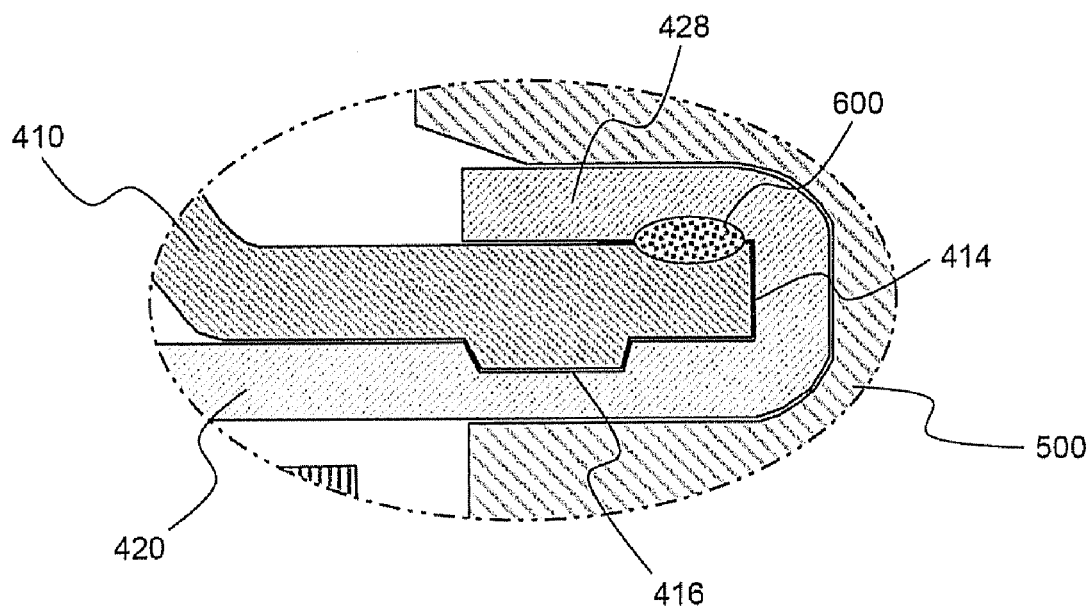
FIG. 5 is an enlarged view illustrating a region B of FIG. 2.

Referring to FIG. 5, the end 428 of the vent 420 is bent in correspondence to the shape of the outer circumferential surface 414 of the top cap 410 and is in tight contact with the upper end surface of the top cap 410 such that the end 428 of the vent 420 can completely surround the outer circumferential surface 414 of the top cap 410. Also, the groove 416 is formed at the lower end surface of the top cap 410 in the lower interface between the top cap 410 and the vent 420, and the corresponding region of the vent 420 is concaved such that the interface between the top cap 410 and the vent 420 is tightly maintained. Consequently, even when external forces, such as vibrations, are applied to the battery, the contact surfaces between the top cap 410 and the vent 420 are stably maintained, and therefore, the increase of the contact resistance is restrained. Also, the size of the interface is large, and therefore, the leakage of an electrolyte is prevented. Furthermore, the coupling force between the top cap 410 and the vent 420 is increased, and therefore, the relative movement between the top cap 410 and the vent 420 is restrained. Consequently, it is possible to attach the current intercepting member 700 (see FIG. 2) to the lower end of the vent 420 at the correct position by welding, and therefore, the occurrence of defectiveness of the battery is prevented during the assembly of the battery.

In addition, a welded part 600 is formed at the upper end surface of the top cap 410 adjacent to the outer circumferential surface 414 thereof in the upper interface between the top cap 410 and the vent 420 so as to accomplish better mechanical coupling and better electrical connection. The welded part 600 is sealed by the gasket 500. Consequently, the degradation of the welded part 600 due to foreign matter is restrained while the battery is used for a long period of time.

Figure 6:
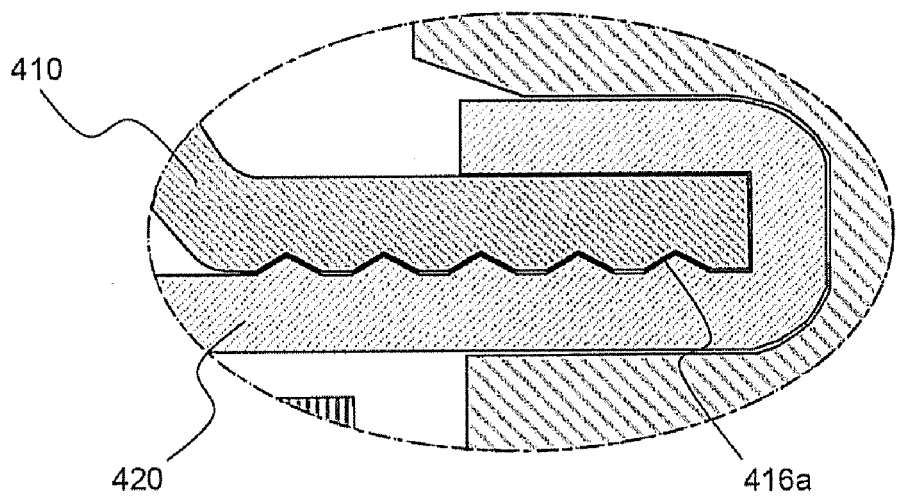
FIG. 6 is a vertical sectional view illustrating an interface structure between a top cap and a vent according to another preferred embodiment of the present invention.
Figure 7:
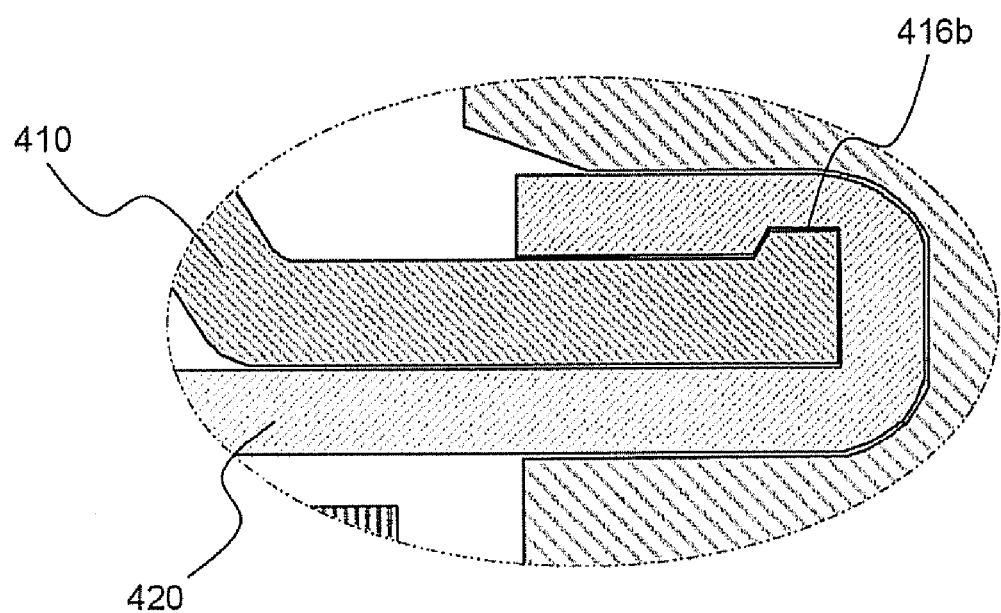
FIG. 7 is a vertical sectional view illustrating an interface structure between a top cap and a vent according to yet another preferred embodiment of the present invention.

FIG. 6 is a vertical sectional view illustrating an interface structure between a top cap and a vent according to another preferred embodiment of the present invention, and FIG. 7 is a vertical sectional view illustrating an interface structure between a top cap and a vent according to yet another preferred embodiment of the present invention.

Referring first to FIG. 6, a saw-toothed groove 416*a* at the lower end surface of the top cap 410, and the upper end surface of the vent 420 is deformed in correspondence to the lower end surface of the top cap 410. As a result, the lower end surface of the top cap 410 and the upper end surface of the vent 420 are in tight contact with each other.

Referring to FIG. 7, a protruding groove 416*b* is formed at the upper end surface of the top cap 410 adjacent to the outer circumferential surface of the top cap 410 so as to form a step, and the lower end surface of the vent 420 is deformed in correspondence to the upper end surface of the top cap 410. As a result, the upper end surface of the top cap 410 and the lower end surface of the vent 420 are in tight contact with each other.

The grooves 416*a* and 416*b* have a common point in that the grooves 416*a* and 416*b* increase the size of the contact interface, although the grooves 416*a* and 416*b* are different from each other in shapes, and therefore, the electrical connection is stably accomplished while excellent sealability is accomplished.

Figure 8:
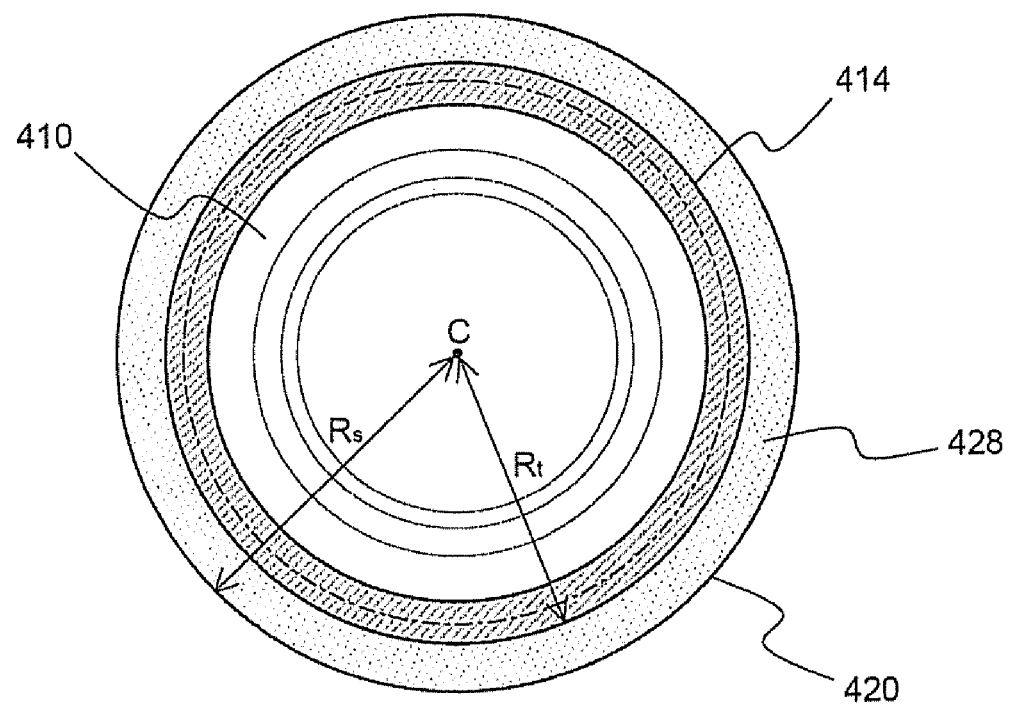
FIGS. 8 and 9 are a plan view and a vertical sectional view illustrating a process for surrounding the outer circumferential surface of a top cap with the end of a vent in the course of manufacturing a cap assembly of FIG. 2.
Figure 9:
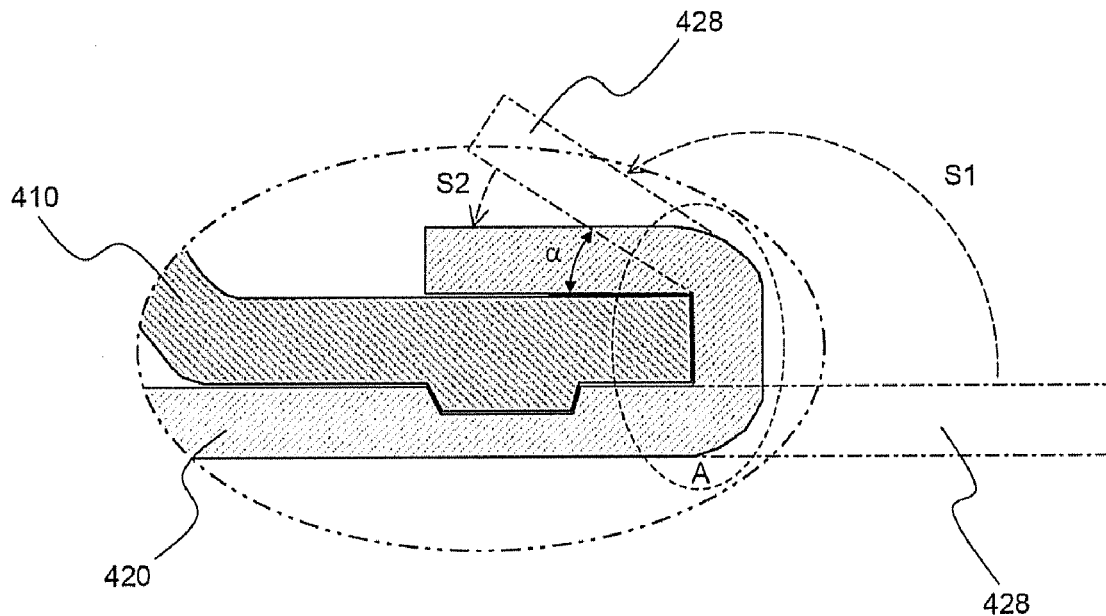

FIGS. 8 and 9 are a plan view and a vertical sectional view typically illustrating a process for surrounding the outer circumferential surface of the top cap with the end of the vent in the course of manufacturing the cap assembly of FIG. 2.

Referring first to FIG. 8, the top cap 410 having an outer diameter $R_t$ is positioned on the vent 420 having an outer diameter $R_s$, which is greater than the outer diameter $R_t$ of the top cap 410. The extension part of the vent 410 obtained due to the difference between the outer diameters, i.e., the end 428 of the vent 420, is bent toward the center axis C of the top cap 410 such that the end 428 of the vent 420 surrounds the outer circumferential surface 414 of the top cap 410. As a result, the end 428 of the vent 420 is brought into tight contact with the outer circumferential surface 414 of the top cap 410.

The bending process is discontinuously carried out. Specifically, as shown in FIG. 9, a step (S1) of primarily bending the end 428 of the plate-shaped vent 420 such that the end 428 of the vent 420 is at an angle α of 30 to 60 degrees, preferably 40 to 50 degrees, to the central axis of the top cap 410 and a step (S2) of secondarily bending the primarily bent end 428 of the vent 420, such that the bent end 428 of the vent 420 is brought into tight contact with the upper end surface of the top cap 410, and pressing the secondarily bent end 428 of the vent 420 are discontinuously carried out. The time difference between the primary bending step (S1) and the second bending step (S2) is a time difference sufficient for stress generated at the time of bending the end 428 of the vent 420 to be dispersed from a bent region A where the stress is concentrated to the vicinity of the bent region A. The discontinuous bending process greatly reduces the possibility that the bent region A is broken.

Hereinafter, an example of the present invention will be described in detail. It should be noted, however, that the scope of the present invention is not limited by the illustrated example.

EXAMPLE 1

A top cap was manufactured using a cold rolled carbon steel sheet (SPCE) coated with Ni, and a vent having the structure shown in FIG. 3 and a current intercepting member having the structure shown in FIG. 4 were manufactured using an aluminum sheet (Al1050-H24). At the lower end surface of the top cap was continuously formed a groove having a width of 0.6 mm and a height of 0.04 mm in a concentric shape.

The vent was formed in the shape of a plate member having an outer diameter of 16 mm and a thickness of 0.3 mm. A first notch constituting the upper bent region of the vent was formed with a diameter of 10 mm and a thickness of 0.13 mm, and a second notch constituting the lower bent region of the vent was formed with a diameter of 4 mm and a thickness of 0.09 mm. The current intercepting member was formed in the shape of a plate member having an outer diameter of 11 mm and a thickness of 0.5 mm. Six gas discharging holes having a diameter of 3 mm were radially formed in the current intercepting member. At the center of the current intercepting member was formed a protrusion having a diameter of 2 mm and a protruding height of 0.2 mm by half blanking.

The vent was manufactured such that the radius of the vent is greater by 1.4 times than that of the top cap. The extension part of the vent was bent as shown in FIG. 9 such that the extension part of the vent surrounded the outer surface of the top cap, and then the bent extension part of the vent was pressed. In addition, the interface between the top cap and the vent was welded by laser at the region adjacent to the outer circumferential surface of the top cap.

A cylindrical secondary battery satisfying Standard 18650 (diameter: 18 mm, length: 65 mm) was manufactured using the cap assembly with the above-stated construction.

COMPARATIVE EXAMPLE 1

A vent having the same diameter as the top cap was used. A cylindrical secondary battery was manufactured according to the same method as described in Example 1 except that the top cap was not surrounded by the vent and the welding operation was performed while the vent and the top cap were in tight contact with each other.

EXPERIMENTAL EXAMPLE 1

While 10 batteries manufactured as described in Example 1 and 10 batteries manufactured as described in Comparative example 1 were placed upside down, a pressure was applied into the cells to 15 Kgf so as to check whether an electrolyte leaked from the corresponding battery before the current intercepting member was broken. The results are indicated in Table 1.

TABLE 1

| | Occurrence of leakage before breakage of current intercepting member | Occurrence of leakage simultaneously with breakage of current intercepting member | Occurrence of leakage after breakage of current intercepting member | Nonoccurrence of leakage |
|---|---|---|---|---|
| Example 1 | 0/10 | 0/10 | 0/10 | 10/10 |
| Comparative example 1 | 4/10 | 1/10 | 2/10 | 3/10 |

It can be seen from Table 1 that the electrolyte did not leak from the batteries of Example 1, whereas the electrolyte leaked from the batteries of Comparative example 1 before and after the breakage of the current intercepting member.

EXPERIMENTAL EXAMPLE 2

Figure 10:
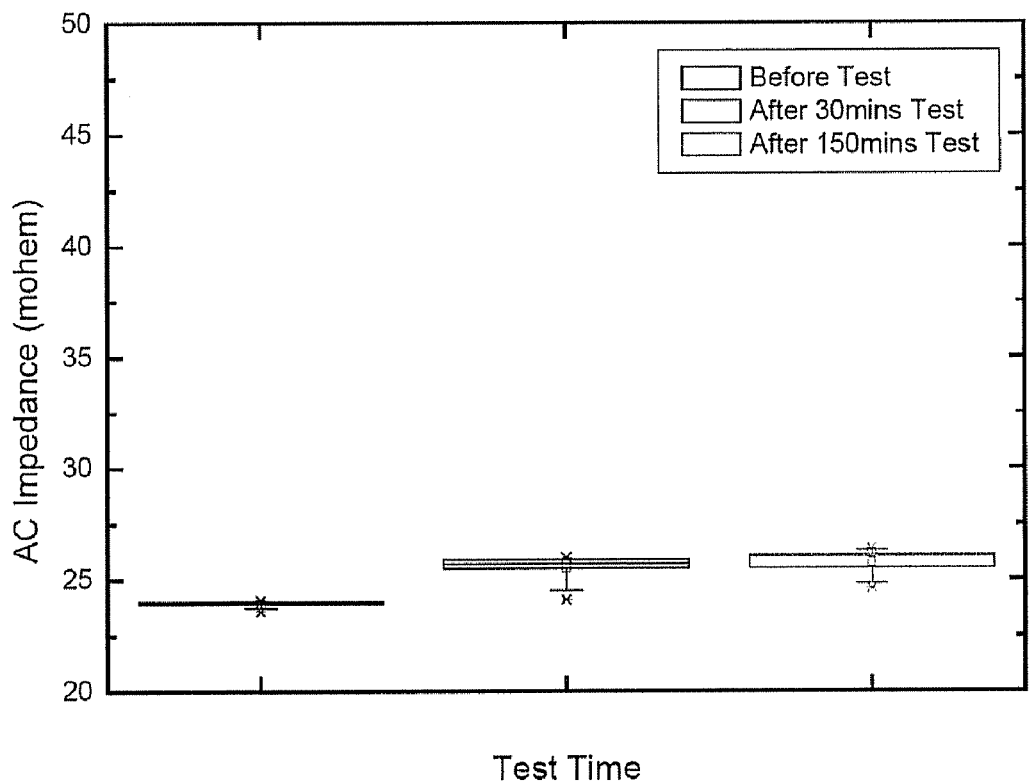
FIGS. 10 and 11 are graphs illustrating drum test results of batteries manufactured as described in Example 1 and Comparative example 1 when the batteries were tested as described in Experimental example 1.

While 12 batteries manufactured as described in Example 1 were fully charged to 4 A and 4.2 V. The fully charged batteries were put into an octagonal drum, and the batteries were revolved at a speed of 66 rpm for 30 minutes. After that, the impedance of the respective batteries was measured. Under the same conditions, the 12 batteries were revolved for 150 minutes, and then the impedance of the respective batteries was measured. It can be interpreted that, when the increase rate of the impedance after the drum test to the impedance before the drum test is less than 10%, the electrical connection of the batteries is excellent. The experimental results are shown in FIG. 10.

Figure 11:
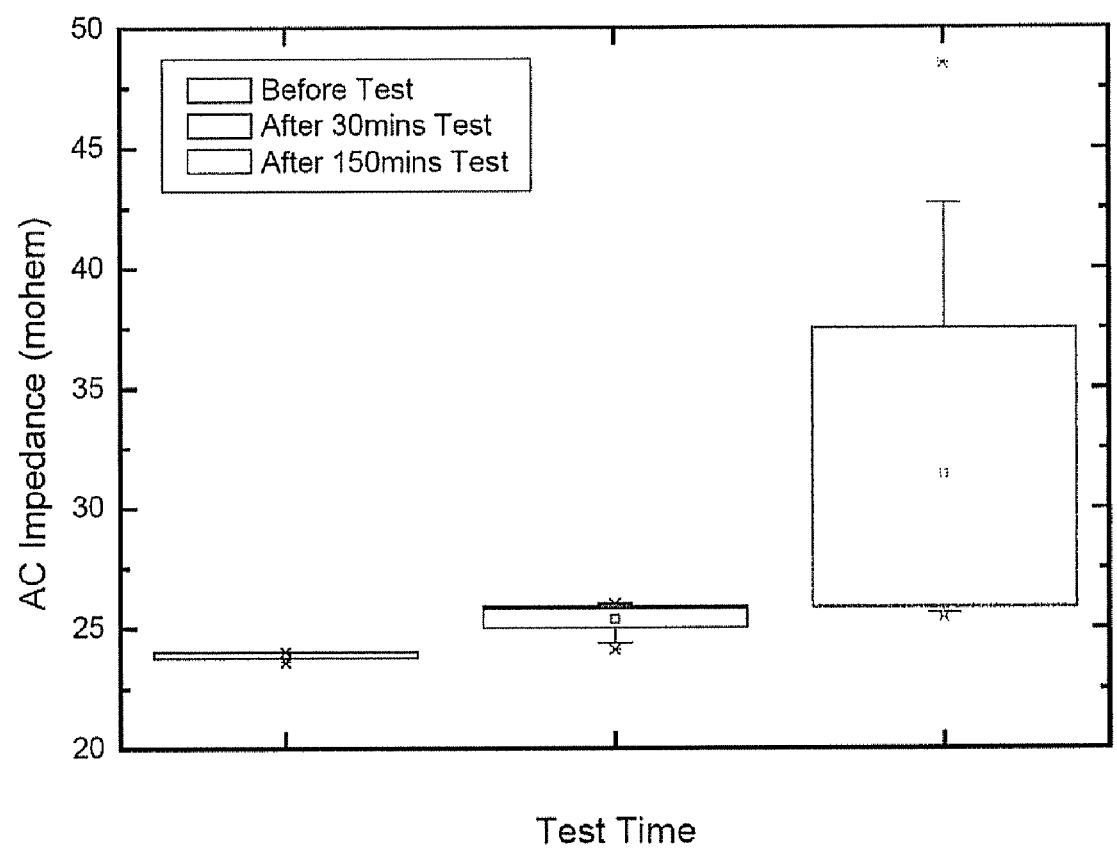

In addition, 12 batteries manufactured as described in Comparative example 1 were repeatedly tested in the same manner. The experimental results are shown in FIG. 11.

As can be seen from these drawings, the increase of the impedance of the batteries of Example 1 was very small after the 30-minute drum test, and the increase rate of the impedance of most of the batteries of Example 1 was less than 10% after the 150-minute drum test. Consequently, it can be seen that the electrical connection of the batteries was stably maintained even when external forces are applied to the batteries. On the other hand, the increase rate of the impedance of the batteries of Comparative example 1 was very small after the 30-minute drum test, whereas the increase rate of the impedance of the batteries of Comparative example 1 was very large after the 150-minute drum test. Consequently, it can be seen that the electrical connection of the batteries was not excellent.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the secondary battery according to the present invention has the effect of accomplishing high charging and discharging rate, providing uniform output even when external physical impacts, such as vibration or dropping, are applied to the secondary battery, and preventing the occurrence of defectiveness during the assembly of the secondary battery. Furthermore, the leakage of the electrolyte out of the battery is restrained under these conditions. Consequently, the secondary battery according to the present invention can be preferably used as a high-output power source.

What is claimed is:
1. A cylindrical secondary battery including:
   a cap assembly constructed in a structure in which a vent, which intercepts electric current and discharges pressurized gas when an interior pressure of the battery is increased due to abnormal operation of the battery, is in direct contact with upper and lower surfaces of a top cap having a protruding central part, wherein an end of the vent is bent to surround and directly contact an outer circumferential surface of the top cap, and a single continuous groove for preventing the leakage of an electrolyte and preventing the occurrence of defectiveness of the battery during the assembly of the battery is disposed in the top cap at interfaces between the vent and the top cap where the vent and top cap directly contact each other, such that the groove is arranged in parallel with the outer circumferential surface of the top cap, and a weld at the interface between the vent and the top cap, adjacent to the outer circumferential surface of the top cap, and sealing the vent and the top cap to each other.

2. The secondary battery according to claim 1, wherein the groove is a protruding groove, a step-shaped (stair-shaped) groove, a depressed groove, or a combination thereof, and the groove is disposed in the upper surface of the top cap, the lower surface of the top cap, or both the upper and lower surfaces of the top cap.

3. The secondary battery according to claim 2, wherein the groove is formed at the lower interface of the top cap in such a manner that a portion of the top cap protrudes.

4. The secondary battery according to claim 1, wherein the height of the groove is 5 to 80% of the thickness of the vent.

5. The secondary battery according to claim 1, wherein the vent is made of aluminum having high conductivity, softness, and malleability.

6. The secondary battery according to claim 1, wherein the length of the top cap surrounded by the vent is approximately 5 to 40% of the radius of the top cap.

7. The secondary battery according to claim 1, wherein the battery is manufactured by primarily bending the end of the vent such that the end of the vent is at an angle of 30 to 60 degrees to a central axis of the top cap, and, after a predetermined period of time necessary for stress to be dispersed from an end region (A) has lapsed, secondarily bending the primarily bent end of the vent, such that the bent end of the vent is brought into tight contact with the upper end surface of the top cap, and then pressing the secondarily bent end of the vent.

8. The secondary battery according to claim 1, wherein the battery is used as a power source for power tools.

9. The secondary battery according to claim 1, wherein
the single continuous groove is a protruding portion of the lower surface of the top cap;
the vent includes a depressed portion corresponding to the protruding portion; and
all complementing surfaces of the corresponding protruding and depressed portions contact each other.

10. The secondary battery according to claim 1, wherein
the single continuous groove is a depressed portion of the lower surface of the top cap;
the vent includes a protruding portion corresponding to the depressed portion; and
all complementing surfaces of the corresponding protruding and depressed portions contact each other.

11. The secondary battery according to claim 1, wherein
the single continuous groove is a protruding portion of the upper surface of the top cap;
the vent includes a depressed portion corresponding to the protruding portion; and
all complementing surfaces of the corresponding protruding and depressed portions contact each other.

12. A cylindrical secondary battery including:
a cap assembly including: a vent which intercepts electric current and discharges pressurized gas when an interior pressure of the battery is increased due to abnormal operation of the battery; a top cap having a protruding central part, wherein an end of the vent is bent to surround and directly contact an outer circumferential surface of the top cap, and the vent is in direct contact with upper and lower surfaces of the top cap; and
a single continuous groove in the to cap at an interface of the vent and the top cap where the vent and top cap directly contact each other, such that the groove is arranged in parallel with the outer circumferential surface of the top cap;
wherein the groove includes a protruding portion of the top cap aligned with a depressed portion of the vent, and all complementing surfaces of the protruding and depressed portions contact each other.

13. The secondary battery according to claim 12, wherein the protruding portion of the top cap protrudes from the lower surface of the top cap.

14. The secondary battery according to claim 12, wherein the protruding portion of the top cap protrudes from the upper surface of the top cap.

* * * * *